United States Patent [19]

Sokolik, Jr. et al.

[11] 4,389,383
[45] Jun. 21, 1983

[54] REGENERABLE PROCESS FOR THE SELECTIVE REMOVAL OF SULFUR DIOXIDE FROM EFFLUENT GASES

[75] Inventors: Joseph E. Sokolik, Jr., Carmel; Alexander J. M. Kosseim, Rye; Gilbert R. Atwood, Briarcliff Manor, all of N.Y.

[73] Assignee: Union Carbide Corporation, Danbury, Conn.

[21] Appl. No.: 326,915

[22] Filed: Dec. 2, 1981

Related U.S. Application Data

[63] Continuation of Ser. No. 153,458, May 27, 1980, abandoned.

[51] Int. Cl.³ .............................................. C01B 17/00
[52] U.S. Cl. .................................................... 423/243
[58] Field of Search ................. 423/243, 242 A, 242 R

[56] References Cited

U.S. PATENT DOCUMENTS

| | | |
|---|---|---|
| 1,783,901 | 12/1930 | Bottoms .............................. 423/243 |
| 2,122,544 | 7/1938 | Girsewald et al. ................. 423/243 |
| 2,128,027 | 8/1938 | Clark .................................. 423/243 |
| 3,658,462 | 4/1972 | Van Scoy ........................... 423/243 |
| 3,980,760 | 9/1976 | Henderson et al. ................ 423/243 |
| 4,113,849 | 9/1978 | Atwood .............................. 423/243 |
| 4,122,149 | 10/1978 | Dunnery et al. ................... 423/242 |
| 4,170,628 | 10/1979 | Rosseim et al. ................... 423/243 |
| 4,201,752 | 5/1980 | Rosseim et al. ................... 423/235 |

*Primary Examiner*—Brian E. Hearn
*Assistant Examiner*—Gregory A. Heller
*Attorney, Agent, or Firm*—Gary L. Wamer

[57] ABSTRACT

A regenerable process for scrubbing $SO_2$ from effluent gases using an aqueous alkanolamine and the corresponding sulfite as the solvent, such amine having a boiling point below about 250° C. at one atmosphere pressure and wherein the alkanolamine solutions containing heat stable salts (HSS) is regenerated by alkali addition, crystallization and vacuum distillation of the amine.

5 Claims, 1 Drawing Figure

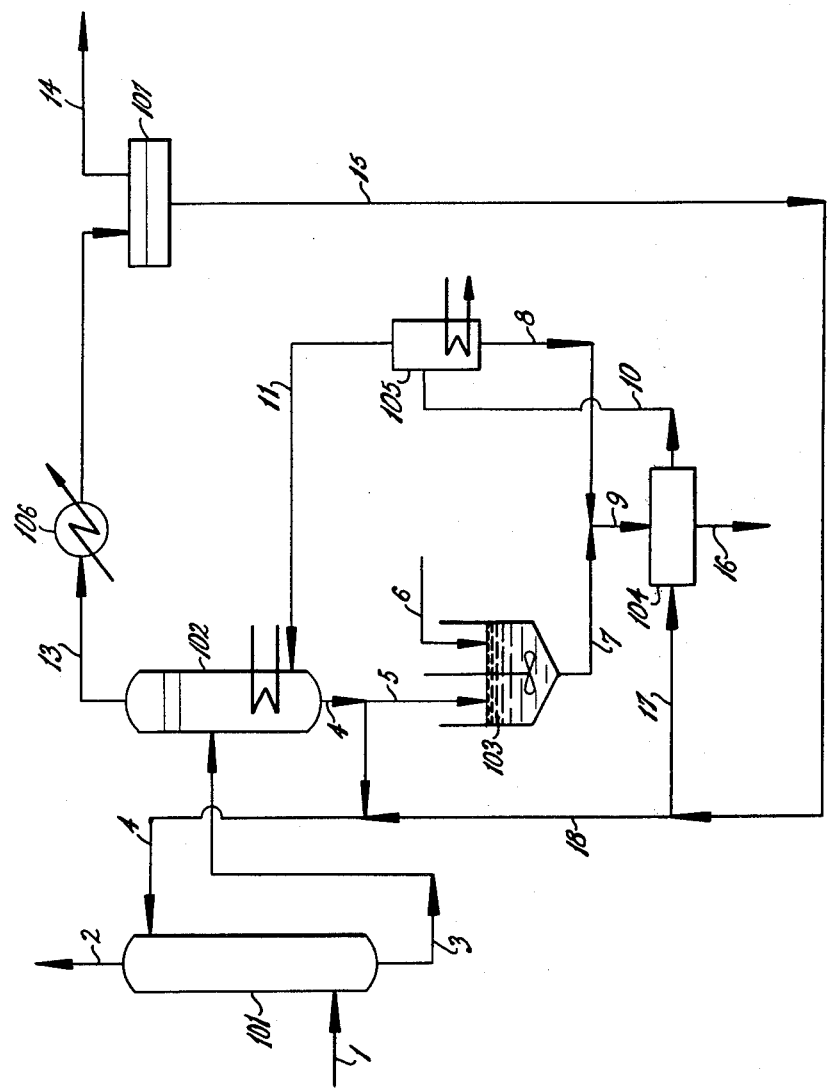

REGENERABLE PROCESS FOR THE SELECTIVE REMOVAL OF SULFUR DIOXIDE FROM EFFLUENT GASES

This application is a continuation of our prior U.S. application Ser. No. 153,458, filed May 27, 1980, now abandoned.

FIELD OF INVENTION

This invention relates to a process for the selective removal of sulfur dioxide ($SO_2$) and mixtures of sulfur dixoide from effluent waste gas streams. More particularly this invention relates to an improved method for regenerating an alkanolamine solvent used in sulfur dioxide absorption.

PRIOR ART AND BACKGROUND

It is known in the art that heat-stable salts (HSS) are formed during the absorption of $SO_2$ in alkanolamine solvents. For example, the sulfate concentration in the absorbent build-up both by absorption of sulfur trioxide and/or sulfuric acid mist which might be present in the stack gas; and by oxidation of dissolved sulfur dioxide with oxygen. A further source of the buildup of sulfates or other sulfur oxyanions is by disproportionation of sulfites and bisulfites. Such HSS include, in addition to sulfates, $SO_4=$; thiosulfates $S_2O_3=$; dithionates $S_2O_6=$; trithionates $S_3O_6=$; higher polythionates, $S_xO_6=$; and other sulfur oxyanion-containing HSS.

A number of methods are known for the removal of HSS from the solvent. For example, the sulfates usually can be removed essentially quantitatively through the use of an alkali metal hydroxide equivalent to twice the molar concentration of the sulfate. This results in substantially quantitative precipitation of the sulfate as the di-alkali metal salt without precipitation of sulfite or bisulfite ions (U.S. Pat. No. 3,872,212). However, other divalent sulfur oxyanions such as thiosulfates, dithionates and higher polythionates also build up in the system and cannot be quantitatively removed by means of alkali metal hydroxide precipitation. Furthermore, the presence of such other divalent sulfur oxyanions of HSS actively interfere with the quantitative removal of the sulfates.

In some instances, as in U.S. Pat. No. 3,503,185 the combustion waste gas is prewashed to remove sulfates which are then purged from the system. Such prewashes are not capable of removing all sulfur trioxide as sulfate and, of course, would not remove sulfates formed in other parts of the process. This patent, furthermore, does not disclose any means for eliminating the thiosulfates, dithionates and higher polythionates.

U.S. Pat. No. 3,790,660 is similar to the above, in showing a water prewash to remove sulfur trioxide and fly ash. In addition, it specifies a purge stream to remove the sulfate as alkali metal salt. There is no system disclosed, however, for removing the thiosulfates, dithionates or other polythionates except by purging them with the sulfate in a waste stream. The latter is relatively dilute, poses a pollution problem in disposal and is expensive to handle.

The use of alkanolamines, such as triethanolamine (TEA), has been found to be a highly efficient way of absorbing $SO_2$ from waste gases in a cycle in which the alkanolamine solvent contacts the effluent stream to absorb the sulfur oxides, and is thereafter stripped by heat to release $SO_2$, whereupon it is collected for safe disposal. The stripped alkanolamine is then recycled back to the absorber for further contact with incoming waste gases and further absorption of sulfur oxides. This type of system is disclosed in U.S. Pat. Nos. 3,620,674 and 3,904,735. HSS such as those mentioned herein above, accumulate in the recycling solvent to a troublesome extent and must be removed in order to maintain the absorption capacity of the solvent. The latter patent does disclose a sulfate purge cycle in which a portion of the lean absorbent is treated with potassium hydroxide or carbonate to precipitate out the sulfate as potassium sulfate. While this type of purge system is quite effective in removing sulfates, it is severely limited in removing other divalent sulfur oxyanions, which also interfere with the sulfate removal. There is no provision made in U.S. Pat. No. 3,620,674 for removing these HSS from the absorbent which gradually but inevitably loses effectiveness because of the accumulation of HSS therein.

Anion exchange resins have also been used to treat the total amount of a recycling absorbent, as in U.S. Pat. Nos. 3,896,214 and 3,833,710. Both patents are based on removing all the $SO_2$ and $SO_3$ from the waste gases, by utilizing ion exchange. This requires the utilization of extremely large amounts of resin and the use of large quantities of reagents to regenerate the resin. This is not only expensive but presents a considerable liquid waste disposal problem. In U.S. Pat. Nos. 4,122,149 and 4,170,628, the use of anion exchange resins is disclosed for the removal of heat stable sulfur oxyanions. In this case, the solvent is aqueous alkanolamine which is used in a cyclic process to separate $SO_2$ from waste gas mixtures, and only a slip stream of the recirculating solvent is passed through the ion exchange resin. However, the chemical and resin costs involved in this step comprised a significant fraction of the operating costs of the overall process.

SUMMARY OF THE INVENTION

It has now been discovered that an alkanolamine having a low boiling point (less than 250° C.) can be used as the solvent in a process for removing $SO_2$ from waste gas streams and the HSS build up therein removed by a process wherein a portion of the HSS laden alkanolamine solvent is reacted with at least one of the substances taken from the class consisting of alkali and alkaline earth oxides; hydroxides and carbonates to form solid inorganic salts. The alkanolamine solvent is then passed to a distillation zone maintained at less than 250 mm Hg and below about 140° C. where the remaining dissolved salts are concentrated and removed and the volatile amine solvent is distilled and recycled back for further $SO_2$ absorption.

DRAWING

The sole FIGURE is a flow diagram illustrating one embodiment of the invention.

DESCRIPTION OF THE BEST MODE OF THE INVENTION

The process of the present invention may be more fully understood by reference to the drawing illustrating one embodiment, which is the best mode presently known for practicing the invention. Referring to the drawing a gas containing undesirable $SO_2$ is introduced into the absorption zone (101) by means of Line (1). As the gas flows upward, it contacts downflowing solvent which is introduced into the upper area of Zone (101) by means of line (4), while monoethanolamine (MEA) is preferred in the best made of operation, other solvents are equally suitable. These include dimethylethanolamine (DMEA), diethylethanolamine (DEEA), benzylamine, etc. The main requirements for solvent selection include: (1) low volatility in the sulfite form, (2) low boiling point (approximately <250° C. at one atmospheric pressure) in order to distill the solvent at a reasonable vacuum, (3) solubility in water, (4) high flash point, and (5) low rate of sulfite oxidation and disproportionation under absorber and stripper conditions, respectively. The temperature in the absorber (101) is in the range from about 30° C. to 60° C., and a gas substantially free of $SO_2$, is removed overhead from absorber (101) by means of Line (2).

The amine solution containing the absorbed $SO_2$ is removed from the bottom of absorber (101) by means of Line (3) and introduced into stripper zone (102). Temperatures and pressures in the stripper zone are in the range from about 80° C. to 110° C., and 50 mm Hg to 500 mm Hg. Water vapor and $SO_2$ are removed overhead by means of Line (13) while the lean amine solution depleted in $SO_2$ is withdrawn from the bottom of stripper (102) by means of Line (4) and recycled to the absorber. The vapor stream (13) is cooled and the water condensed in (106) and sent to reservior (107) while the $SO_2$ is recovered via line (14). For simplicity, items such as pumps, coolers and heat exchangers are not shown. Furthermore, it is understood that absorber (101) and stripper (102) may comprise any suitable number and arrangement of stages.

As pointed out heretofore, the solvent gradually builds up heat stable salts which need to be removed, in order to maintain the capacity of the absorbent solution for $SO_2$ removal. In accordance with the present invention, a portion, usually 2–10%, of the recirculating solvent is segregated by means of Line (5) and sent to mixing zone (103). In the best mode $Na_2CO_3$ solution having a concentration in the range from about 20 wt % to 50 wt % is introduced into the mixing tank (103) by means of Line (6) where satisfactory mixing is insured. The amount of $Na_2CO_3$ introduced will depend on the quantity of sulfur oxy anions introduced into mixing zone (103) by means of line (5). However one equivalent of sodium cation is added per one equivalent of sulfur oxy-anions. Other substances such as lime, limestone and other alkali or alkaline earth oxides hydroxides and carbonates may be used. A slurry is withdrawn from the bottom of mixing zone (103) by means of Line (7) and introduced into a filtering zone (104), wherein the insoluble inorganic salts are removed by means of Line (16). It is to be understood that zone (104) may comprise any suitable means for the separation of solids from liquid, as, for example, filters, centrifuges and the like.

The aqueous solution containing amine solvent and the soluble inorganic salts is removed from filtering zone (104) via Line (10) and introduced into a distillation zone (105). Water and MEA are removed overhead by means of Line (11), and the waste inorganic salts are precipitated and concentrated and withdrawn from the bottom of distillation zone (105) as a slurry by means of Line (8), and joined with the slurry from line (7) in line (9) returned to filtering zone (104). It is also possible to return the bottom slurry in Line (8) to the mixing zone (103). In order to minimize solvent losses, a portion of the process water (stream 17) is used to wash the filter cake and then returned to still (105).

The overhead vapor from distillation zone (105) is preferably recycled to the bottom of $SO_2$ stripper (102) by means of Line (11) thereby the heat utilized for distillation is substantially recovered in the stripping zone (102). The temperature and pressure in still (105) are adjusted to minimize degradation and disproportionation products and also to recover substantially all the amine solvent overhead. This is preferentially accomplished by maintaining the temperature below approximately 140° C. and by adjusting the pressure according to the particular solvent used.

The aforementioned description is intended only to be illustrative of the best mode of practicing the present process and should not be construed to limit the scope or application of the concept of this invention. It would be obvious of one skilled in the art that various modifications could be made of the operation described above, without affecting the invention.

For example, while the contaminants in the absorbent solvent in the above illustration were partially concentrated in filtering Zone (104), it is entirely possible to by-pass this step. Furthermore, the water and amine recovered overhead by means of Line (11) can be combined with stream (13) and recycled via lines (15) and (18) to the absorption process. It would also be apparent to one skilled in the art that the filter wash water shown in the process as Line (17) can be obtained from any suitable source such as makeup water to the process. Further the inorganic heatstable salts by-products from the neutralization step, can be sent to a coal-fired furnace. In this fashion, the salts are calcined to give off $SO_2$ and a residual oxide. Sulfur dioxide will be recycled back, along with the flue gas, to the sulfur recovery unit; while the residual metal oxide will be disposed of along with the fly ash from the coal, and will help to neutralize the natural acidity of the ash. In addition, residual amine solvent which might be present with the by-product stream, will be burned as fuel. All this will help to significantly reduce the waste disposal problem associated with sulfur dioxide recovery processes.

EXPERIMENTAL DATA AND BASIS OF THE INVENTION

An experimental program was undertaken to develop a process to regenerate amine solvents from HSS which would minimize high chemical costs and eleminate large liquid waste stream. One process that appeared promising was a salt neutralization procedure to liberate the amine which could then be recovered by distillation. However it was unexpectly discovered that there exists a critical relationship between solvent, temperature and pressure in order to achieve a satisfactory process. The following test data illustrates the criticalility of solvent, temperature and pressure.

Test No. 1

300 gm of a typical TEA solvent having a composition shown in TABLE I was mixed with 227 gm of $Na_2CO_3.10\ H_2O$ and 100 gm water. The solution was heated to approximately 80° C. while mixing, until no $CO_2$ evolved. The mixture was then inserted in a standard roto-flash evaporator and heated over an oil bath. The pressure was maintained at 20 mm Hg absolute. When the oil bath temperature reached −150° C., discoloration started to occur. The bottom solution was a brown-black sludge, while the overhead distillate was amber in color with a red oily substance.

These disappointing results were thought to be caused by inadequate neutralization, and a second test was run with double the amount of sodium carbonate.

Test No. 2

The following ingredients were mixed and the same procedure as in Test No. 1 was used. Similar results were also obtained.

300 gms TEA solvent (composition shown in Table I)
454 gms $Na_2CO_3.10\ H_2O$
200 gms $H_2O$ These results were even more disappointing in light of the fact that it is a common industrial practice to reclaim MEA solvent used for $CO_2$ removal by a similar method. To establish whether the type of solvent was critical, tests No. 3 and 4, below, were conducted with MEA solutions, neutralized with both $Ca(OH)_2$ and $Na_2CO_3$.

Test No. 3

MEA solvent whose composition is shown in Table I, was neutralized with a 100% excess $Ca(OH)_2$, using the same procedure as in Test No. 1. The mixture was then inserted in a standard roto-flash evaporator and the pressure maintained at 100 mm Hg. Upon heating, at an oil bath temperature above 144° C., some sulfur-like material accumulated in the overhead, with slurry in the kettle turning yellow.

Test No. 4

A similar procedure was used as in Test No. 3, except that $Na_2CO_3$ was used instead of lime. At an oil bath temperature of approximately 140° C., a yellow sulfur-like material appeared in the overhead with a darkening color of the bottom residue.

It was then suspected that the presence of sulfur oxyanions in solution led to complications which are not encountered in $CO_2$-containing systems. The main problem being the formation, at temperature $\geq 140°$ C., of degradation products which distill overhead and contaminated the amine. It was then thought that by operating the distillation step below approximately 140° C. of a reclaiming procedure of this type could be used.

The following three runs were then conducted with test distillation apparatus which provided better control over temperature to establish the above criticality. The initial MEA solvent used in these experiments contained approximately 40% of the amine tied up as HSS, and was analyzed as follows:

| | |
|---|---|
| Water, wt % | 25.1 |
| MEA, wt % | 42.8 |
| $SO_2$, wt % | 16.6 |
| Heat stable sulfur oxyanion | 15.5 |
| Loading, mole $SO_2$/mol MEA | 0.62 |
| MEA as HSS/Total MEA, (M/M) | 0.40 |

This solvent was mixed with water and sodium carbonate, in a ratio of 100:130.6:76.8, by weight, and heated to 100° C. until degasing stopped. The slurry was then filtered and the filtrate used in Test No. 5, 6 and 7.

Test No. 5

754 gms of the above filtrate was fed into the test distillation apparatus and the experiments carried out at one atmospheric pressure. Three overhead distillate cuts were taken at various temperatures and the results shown in Table II. At approximately 155° C. bottom temperature, the residue had a greenish-brown tint, and was greenish in color at the end of the experiment (bottom temp. 164° C.). Furthermore, the third and last overhead sample had a strong odor of hydrogen sulfide and/or sulfur. Furthermore, the overhead distillate samples were analyzed and found to contain a higher ratio of "MEA as HSS/total MEA," than the starting feed (0.52 vs 0.40). All these negative results indicated the unsuitability of the above procedure for solvent reclaiming.

Test No. 6

Test No. 5 was repeated, except that the pressure was maintained at 380 mm Hg absolute, instead of one atmosphere. Similar results were obtained, and at a final bottom temperature of 155° C., the bottom slurry had a greenish color and the overhead sample had a strong odor of $H_2S$ and/or sulfur. The analytical results are shown in Table II and the average overhead distillate product had a slight increase in HSS over the feed (0.42 vs 0.40, MEA as HSS/total MEA).

Test No. 7

Test No. 5 was repeated at 100 mm Hg pressure and the results were very encouraging. The maximum bottom temperature attained in this run was 128° C. The overhead product did not smell of $H_2S$ or sulfur, and the bottom slurry product did not have a greenish color, but rather a caramel-brown tint. More important, the object of this invention was finally achieved, as the recovered MEA overhead product was much lower in HSS content than the original feed solvent, 0.21 vs 0.40 (see Table II).

Test 7 illustrates that at temperatures below about 140° C. e.g. 128° C. and at pressures below atmospheric e.g. 100 mm Hg using a solvent that has a boiling point below about 250° C. a process for reclaiming the amine using neutralization and distillation is achieved.

Advantages

The main advantages of this invention over the prior art is that it provides an efficient and economical method of reverting alkanolamine salts to free amine suitable for $SO_2$ absorption. A further advantage is that it minimizes or eliminates the problem associated with liquidwaste disposal; as the only waste material is a relatively small amount of solids which can be easily disposed of. Still other advantages of the invention are that it can be readily integrated into existing $SO_2$ removal processes at relatively low investment costs, by utilizing the same condensing and vacuum systems used for solvent stripping.

TABLE I

| INITIAL SOLVENT COMPOSITION | | |
|---|---|---|
| | Test No. | |
| | 1 and 2 | 3 |
| | Solvent type | |
| Composition | TEA | MEA |
| $H_2O$, wt % | 24 | 12 |
| Total amine, wt % | 52.9 | 45.6 |
| $SO_2$ (as sulfite and bisulfite), wt % | 12.2 | 24.9 |
| Heat Stable Sulfur Oxyanion | 10.9 | 17.5 |
| Loading, mol $SO_2$/mol amine | 0.78 | 0.90 |
| Amine as HSS/Total amine | 0.37 | 0.42 |

TABLE II

RESULTS OF DISTILLATION EXPERIMENTS
100, 380 and 760 mm Hg

|  | Test No. | | |
| --- | --- | --- | --- |
|  | 5 | 6 | 7 |
| Pressure, mm Hg abs. | 760 | 380 | 100 |
| Bottom Temp. max °C. | 164 | 155 | 128 |
| Overhead Composition MEA as HSS/ Total MEA | 0.52 | 0.42 | 0.21 |

What is claimed is:

1. In a process for removing sulfur dioxide from a mixture of gases wherein said mixture is contacted in an absorption zone with an amine solvent in aqueous solution to absorb $SO_2$ to form an $SO_2$ rich aqueous amine solution which is then passed to a stripping zone where $SO_2$ is removed from such aqueous amine solution to form a lean aqueous amine solution containing some $SO_2$ and heat stable salts which is recycled to the absorption zone the improvement comprising:
   (a) using as the solvent an amine; having a boiling point below about 250° at one atmosphere;
   (b) removing a portion of said lean aqueous amine being recycled to said absorption zone and passing said portion to a reaction zone;
   (c) admixing said portion of lean aqueous amine with at least one alkali or alkaline earth oxide, hydroxide or carbonate in an amount such that at least one equivalent of metal cation is added per one equivalent of sulfur oxy anions present in said lean aqueous amine solution to form a heat stable solid precipitant;
   (d) passing said reacted mixture to a separation zone which is at a temperature of less than about 140° C. and at a pressure less than 250 mmHg, and maintaining said mixture at said temperature and pressure, removing as an overhead vapor phase a solution containing mainly all water and amine which is recycled back to said absorption zone and collecting a solid bottom residue comprising essentially all sulfur oxy anion salts.

2. Process according to claim 1 wherein the solvent is at least one member of the group consisting of monoethanolamine, dimethylethanolamine diethylethanolamine and benzylamine.

3. Process according to claim 1 wherein the solvent is monoethanolamine.

4. Process according to claim 1 wherein the lean aqueous amine is reacted in step (c) with sodium carbonate.

5. Process according to claim 1 wherein the portion of lean aqueous amine passed to the reaction zone is 2–10% of the stream being recycled the absorption zone.

* * * * *